US007257876B2

(12) United States Patent
Dallimore

(10) Patent No.: US 7,257,876 B2
(45) Date of Patent: Aug. 21, 2007

(54) HOLDER FOR A WEAR PART OF A CRUSHER

(75) Inventor: Rowan Dallimore, Radstock (GB)

(73) Assignee: Sandvik Intellectual Property AB, Sandviken (SE)

(*) Notice: Subject to any disclaimer, the term of this patent is extended or adjusted under 35 U.S.C. 154(b) by 0 days.

(21) Appl. No.: 10/525,977

(22) PCT Filed: Aug. 27, 2003

(86) PCT No.: PCT/SE03/01317

§ 371 (c)(1),
(2), (4) Date: Jul. 29, 2005

(87) PCT Pub. No.: WO2004/020100

PCT Pub. Date: Mar. 11, 2004

(65) Prior Publication Data

US 2005/0269438 A1 Dec. 8, 2005

(30) Foreign Application Priority Data

Aug. 28, 2002 (SE) .................................. 02025328

(51) Int. Cl.
*B23Q 3/00* (2006.01)
*B02C 13/18* (2006.01)
*B02C 19/00* (2006.01)

(52) U.S. Cl. .................. 29/464; 29/525.02; 29/525.11; 241/275; 241/300

(58) Field of Classification Search .................. 29/464, 29/466, 525.01, 462, 525.02, 525.11; 241/300, 241/197, 275
See application file for complete search history.

(56) References Cited

U.S. PATENT DOCUMENTS

| | | | | |
|---|---|---|---|---|
| 4,940,188 | A * | 7/1990 | Rodriguez et al. | 241/275 |
| 5,029,761 | A * | 7/1991 | Bechler | 241/275 |
| 6,874,714 | B2 * | 4/2005 | Garvin | 241/5 |
| 2005/0269437 | A1 * | 12/2005 | Dallimore et al. | 241/275 |
| 2006/0011761 | A1 * | 1/2006 | Dallimore et al. | 241/275 |
| 2006/0011762 | A1 * | 1/2006 | Dallimore et al. | 241/275 |
| 2006/0163400 | A1 * | 7/2006 | Dallimore et al. | 241/275 |

FOREIGN PATENT DOCUMENTS

| | | | |
|---|---|---|---|
| EP | 0187252 | A2 | 7/1986 |
| EP | 388825 | A2 * | 9/1990 |

OTHER PUBLICATIONS

International Search Report dated Nov. 5, 2003.
International-Type Search Report for National Appl. No. SE 0202532-8 dated Mar. 18, 2003.

* cited by examiner

*Primary Examiner*—Essama Omgba
(74) *Attorney, Agent, or Firm*—Drinker Biddle & Reath LLP

(57) ABSTRACT

A rotor of a vertical shaft impact crusher includes a vertical rotor wall segment having a first wall portion being substantially tangential in relation to the rotor and a second wall portion being angled in relation to the first wall portion. A tip holder for mounting at an outflow opening of such a rotor includes a holding part for holding a wear tip. A fastening mechanism is attached to the holding part. The fastening mechanism is adapted to extend along the first wall portion and through the second wall portion from one side thereof. A fixing mechanism is detachably fixable to the fastening mechanism at the other side of the second wall portion.

10 Claims, 4 Drawing Sheets

VI

HOLDER FOR A WEAR PART OF A CRUSHER

TECHNICAL FIELD OF THE INVENTION

The present invention relates to a tip holder for mounting at an outflow opening of a rotor of a vertical shaft impact crusher, said rotor comprising a vertical rotor wall segment having a first wall portion being substantially tangential in relation to the rotor and a second wall portion being angled in relation to said first wall portion, said tip holder comprising a holding part for holding a wear tip.

The present invention also relates to a method of mounting a tip holder to an outflow opening of a rotor of a vertical shaft impact crusher, said rotor comprising a vertical rotor wall segment having a first wall portion being substantially tangential in relation to the rotor and a second wall portion being angled in relation to said first wall portion, said tip holder comprising a holding part for holding a wear tip.

BACKGROUND ART

Vertical shaft impact crushers (VSI-crushers) are used in many applications for crushing hard material like rocks, ore etc. U.S. Pat. No. 3,154,259 describes a VSI-crusher comprising a housing and a horizontal rotor located inside the housing. Material that is to be crushed is fed into the rotor via an opening in the top thereof. With the aid of centrifugal force the rotating rotor ejects the material against the wall of the housing. On impact with the wall the material is crushed to a desired size. The housing wall could be provided with anvils or have a bed of retained material against which the accelerated material is crushed.

The rotor of a VSI-crusher usually has a horizontal upper disc and a horizontal lower disc. The upper and lower discs are connected with a vertical rotor wall. The upper disc has an aperture for feeding material into the rotor. The material lands on the lower disc and is then thrown out of the rotor via openings in the rotor wall. The vertical rotor walls are provided with wear tips of a hard material, such as a hard metal or a ceramic, to protect them from wear caused by the material leaving the rotor at a high speed.

The wear tips described in U.S. Pat. No. 3,154,259 are fixed to holes in the upper and lower discs.

U.S. Pat. No. 3,174,697 describes impeller shoes for a rotor. The impeller shoes, which each have a hard metal tip, are bolted to a horizontal impeller disc.

GB 2,198,060 describes a carrier body. The carrier body, being a substantially plate shaped body, holds a hard metal tip at one end thereof. At a second end thereof the carrier body is bolted to the rotor wall by a through bolt. The bolt fixing the carrier body in position is subjected to heavy wear.

The wear tips described above are quite difficult to replace when they have become worn out. The down time related to maintenance work is thus rather long. In some cases a bolt wear protection plate is required to protect the bolt holding the wear tip.

SUMMARY OF THE INVENTION

It is an object of the present invention to provide a tip holder which decreases the down time required for maintenance of the rotor.

It is another object of the invention to provide a tip holder which makes it possible to reduce the number of wear plates required to protect the tip holder.

A further object of the invention is to provide a tip holder that allows a higher rotor speed and thus increases the velocity of the material ejected from the rotor.

These objects are achieved with a tip holder according to the preamble and characterised in that a fastening means is attached to the holding part, the fastening means being adapted to extend along said first wall portion and through said second wall portion from one side thereof, a fixing means being detachably fixable to the fastening means at the other side of said second wall portion.

An advantage with the tip holder according to the preamble is that it is easy to mount and to dismount. Inside the rotor a bed of material is built up against the wall segment. Since the fastening means extend along a first wall portion the tip holder may be dismounted without having to remove the bed beforehand. The fact that the fixing means are attached to the fastening means at the other side of the second wall portion decreases the wear and damage to the fastening means. The removal of the fixing means thus becomes easier which further decreases the down-time required for maintenance. With fixing means located inside the bed of material as in many prior art crushers there is always a risk that the fixing means are worn down such that the tip holder falls out of the rotor. This risk is also decreased with the present invention since the fixing means need not be put inside the bed of material. The fastening means must be kept intact both for easy removal of the tip holder and for the possibility of putting the tip holder back at another location in the rotor.

A further advantage is that since the fixing means are detachably fixed at the other side of the second wall portion they are much less subjected to wear. Thus no wear plates protecting the fixing means is required. The absence of such protecting wear plates makes the rotor lighter and allows for a higher rotor speed. Also the lower wear and the absence of said protecting wear plates will allow the tip holder to locate the wear tip at the absolute periphery of the rotor, thus further increasing the peripheral speed of the wear tip and increasing the speed of the material ejected from the rotor.

According to a preferred embodiment the fastening means extends along the radially inner side of said first wall portion. In this way the fastening means are protected from rocks bouncing back from the crusher wall. Also the fastening means assist in building a stable bed of rocks inside the rotor against the rotor wall.

Preferably the tip holder comprises a securing means for removably securing the tip holder to a free vertical edge of said first wall portion. An advantage with this is that the tip holder will be firmly secured at the free edge. There is thus no risk that the tip holder gets bent due to rocks bouncing back from the rotor wall. Still more preferably said securing means comprises a hook adapted for gripping said edge of said first wall portion. A hook makes it easy to provide a strong securing of the tip holder to the first wall portion. The mounting and dismounting of the tip holder also becomes easier since simply sliding the tip holder in or out of position along the first wall portion will make the hook grip or release the vertical edge.

According to a preferred embodiment the fastening means comprises at least one shoulder adapted to hold a horizontal wear plate in position. The shoulder assists in holding the wear plate in position and also allows the wear plate to get in close contact with the first wall portion located behind the fastening means. This improves the function of the wear plates and decreases the wear on the rotor walls. Still more preferably the fastening means comprises a lower shoulder and an upper shoulder each being adapted to hold a horizontal wear plate in position. An advantage with this is that the tip holder may hold both an upper and a lower horizontal wear plate in position. It is also possible to change the position of the individual tip holders in the case several tip holders are mounted at one rotor opening.

Preferably the fastening means comprises a threaded bar intended for extending along said first wall portion and through a hole in said second wall portion. A threaded bar makes the tip holder cheap to manufacture and provides a simple and efficient way of fixing the tip holder. The hole needed in the second wall portion is made by simply drilling a hole. Still more preferably the fixing means comprises a nut which is adapted to provide a tensile stress in the threaded bar when fixing said fixing means to the threaded bar at said other side of the second wall portion. The tensile stress makes the tip holder fit tightly to the rotor opening. The risk that the tip holder would come loose of the rotor is thus reduced. It is also easy to advice a person mounting the tip holder to apply a certain momentum to the nut to obtain a desired fixing force. In the event securing means and/or hooks described above are used as described above the tensile stress tightens the tip holder between the free vertical edge of the first wall portion and the second wall portion.

According to a preferred embodiment the fastening means comprises a surface adapted for the application of a force in a direction parallel to said first wall portion. By applying a force or a strike to the surface the frictional forces of the bed of retained material may be loosened such that the tip holder may easily be removed without having to pick away the entire bed. This makes removal much quicker in cases where the bed of material located against the tip holder is very hard and/or tenacious.

It is another object of the present invention to provide a method of mounting a tip holder which method decreases the down time required for maintenance of the rotor.

This object is achieved with a method according to the preamble characterised in that in that the tip holder is guided along said first wall portion such that a fastening means attached to the holding part extends along said first wall portion and passes through said second wall portion from one side thereof, and a fixing means is fixed to the fastening means at the other side of said second wall portion.

An advantage of this method is that the mounting is very quick and provides a proper position of the tip holder at the outflow opening. Another advantage is that a bed of material that has built up inside the rotor against a rotor wall and a tip holder that is to be replaced need not be removed before a new tip holder is put in place by sliding it into position.

These and other aspects of the invention will be apparent from and elucidated with reference to the embodiments described hereafter.

BRIEF DESCRIPTION OF THE DRAWINGS

The invention will hereafter be described in more detail and with reference to the appended drawings.

DETAILED DESCRIPTION OF PREFERRED EMBODIMENTS OF THE INVENTION

Figure 1:
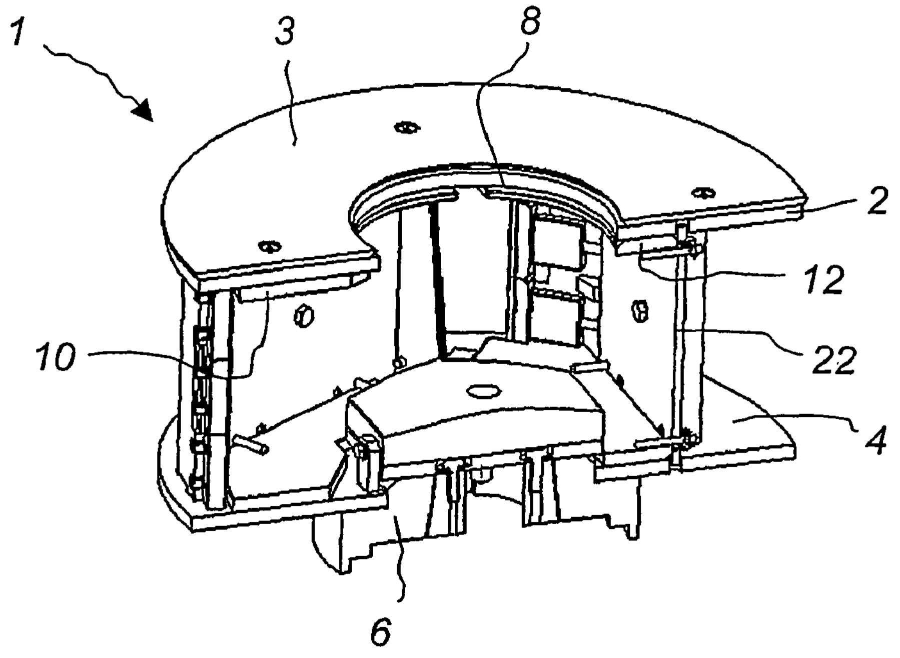
FIG. 1 is three-dimensional section view and shows a rotor for a VSI-crusher

FIG. 1 shows a rotor 1 for use in a VSI-crusher. The rotor 1 has a roof in the form of an upper disc 2 having a top wear plate 3 and a floor in the form of a lower disc 4. The lower disc 4 has a hub 6, which is welded to the disc 4. The hub 6 is to be connected to a shaft (not shown) for rotating the rotor 1 inside the housing of a VSI-crusher.

Figure 2:
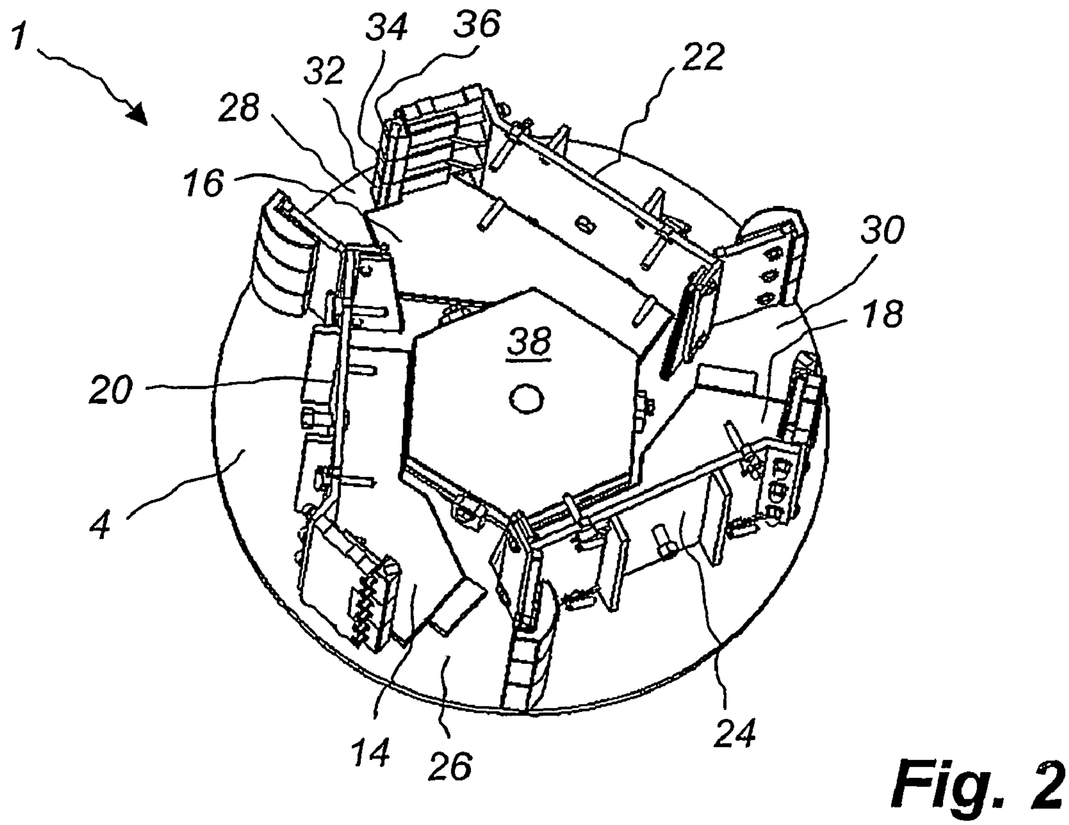
FIG. 2 is a three-dimensional view and shows the rotor of FIG. 1 with the upper disc removed.

The upper disc 2 has a central opening 8 through which material to be crushed can be fed into the rotor 1. The upper disc 2 is protected from wear by upper wear plates 10 and 12. The upper disc 2 is protected from rocks impacting the rotor 1 from above by the top wear plate 3. As is better shown in FIG. 2 the lower disc 4 is protected from wear by three lower wear plates 14, 16 and 18.

The upper and lower discs 2, 4 are separated by and held together by a vertical rotor wall which is separated into three wall segments 20, 22 and 24. The gaps between the wall segments 20, 22, 24 define outflow openings 26, 28, 30 through which material may be ejected against a housing wall.

At each outflow opening 26, 28, 30 the respective wall segment 20, 22, 24 is protected from wear by three wear tips 32, 34, 36 located at the trailing edge of the respective wall segment 20, 22, 24.

A distributor plate 38 is fastened to the centre of the lower disc 4. The distributor plate 38 distributes the material that is fed via the opening 8 in the upper disc 2 and protects the lower disc 4 from wear and impact damages caused by the material fed via the opening 8.

Figure 3:
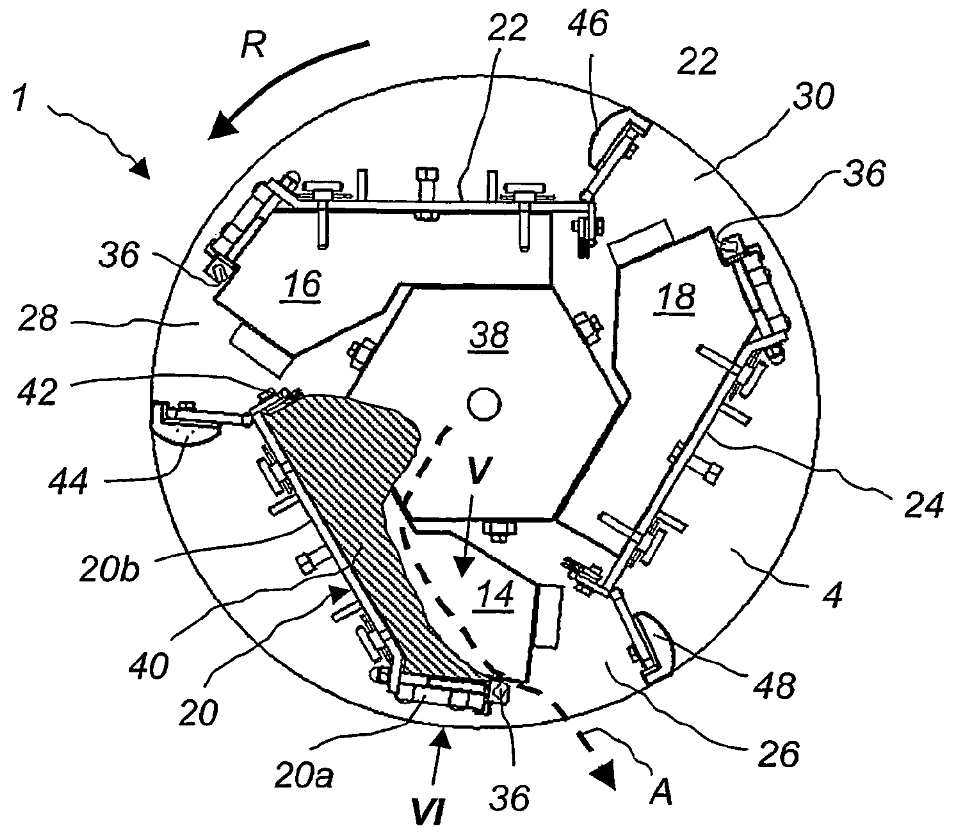
FIG. 3 shows the view of FIG. 2 as seen from above in a two dimensional perspective.

During operation of the rotor 1 a bed 40 of material is built up inside the rotor 1 against each of the three wall segments 20, 22, 24. In FIG. 3 only the bed 40 located adjacent to the wall segment 20 is shown. The bed 40, which consists of material that has been fed to the rotor 1 and then has been trapped inside it, extends from a rear support plate 42 to the wear tips 32, 34, 36. The bed 40 protects the wall segment 20 and the wear tips 32, 34, 36 from wear and provides a proper direction to the ejected material. The dashed arrow A describes a typical passage of a piece of rock fed to the rotor 1 via the central opening 8 and ejected via the outflow opening 26. The arrow R indicates the rotational direction of the rotor 1 during operation of the VSI-crusher.

Each wall segment 20, 22, 24 is provided with a cavity wear plate 44, 46, 48, each preferably having three cavity wear plate portions. The cavity wear plates 44, 46, 48 protect the rotor 1 and in particular the wear tips 32, 34, 36 from material rebounding from the housing wall and from ejected material and airborne fine dust spinning around the rotor 1.

Figure 4:
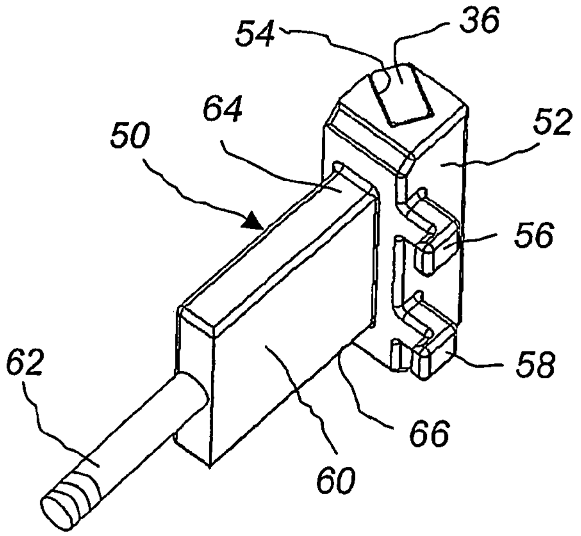
FIG. 4 is a three-dimensional view of a wear tip and tip holder.

In FIG. 4 a first embodiment of a tip holder 50 according to the invention is shown. The tip holder 50 has a holding part 52 shaped as a rectangular parallelepiped. The holding part 52 has a longitudinal recess 54 in which the wear tip 36 is located. The wear tip 36 may be welded or glued to the holding part 52. The holding part 52 has two hooks 56, 58. The two hooks 56, 58 are located at the opposite face of the holding part 52 in relation to the recess 54. A holding plate 60 is attached to the holding part 52. The holding plate 60, which is a flat rectangular plate, is attached to the holding part 52 at a position between the hooks 56, 58 and the recess 54. At an end of the plate 60, said end being remote from the holding part 52, a round, threaded bar 62 is attached. The bar 62 is located in generally the same plane as the holding plate 60 and is perpendicular to the wear tip 36.

As can be seen in FIG. 4 the holding plate 60 has a smaller vertical extension than the holding part 52. Thereby an upper shoulder 64 and a lower shoulder 66 are formed at the respective transitions between the plate 60 and the part 52.

Figure 5:
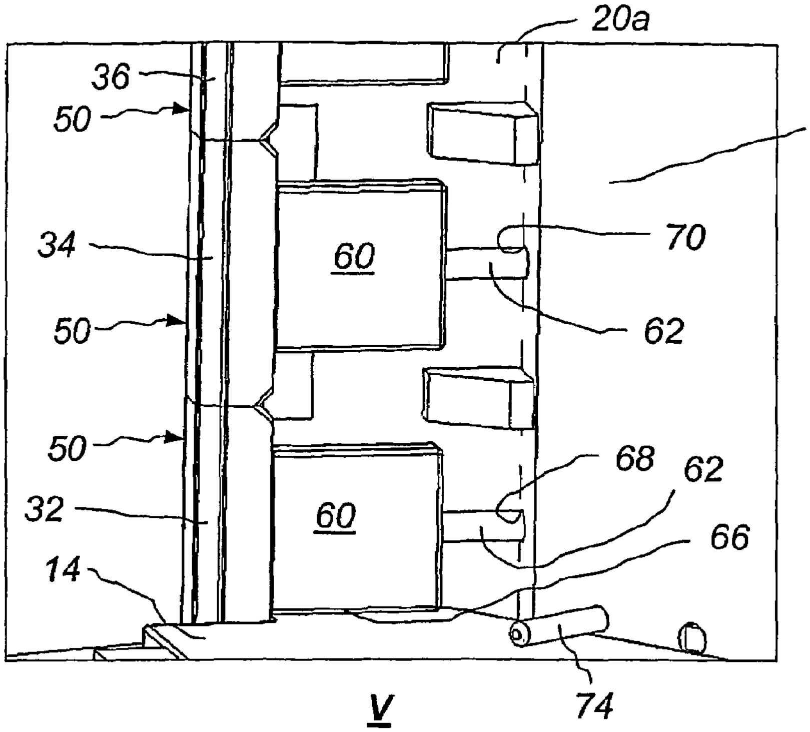
FIG. 5 shows a part of a wall segment as seen from the inside, i.e. in the direction of arrow V in FIG. 3, of the rotor.

In FIG. 5 a part of the wall segment 20 as seen from the inside, i.e. in the direction of the arrow V in FIG. 3, is shown. The wall segment 20 comprises a first wall portion 20*a* which is substantially tangential to the disc 4 and thus the rotor 1. A second wall portion 20*b* is fixed to the first portion 20*a* such that an "L" with an angle of about 120° is formed of the two portions 20*a*, 20*b*. The three wear tips, 32, 34, 36, each held by a tip holder 50, are attached to the wall 20 in such a way that the wear tips 32, 34, 36 form a continuous, vertical row of wear tips. The second wall portion 20*b* is provided with holes 68, 70, 72 through which the round bar 62 of the respective tip holder 50 extends.

As can be seen in FIG. 5 the lower wear plate 14 is inserted under the lower shoulder 66 of the tip holder 50 holding the lower tip 32. This shoulder 66 thus assists in holding the wear plate 14 in place under the shoulder 66. The upper shoulder 64 (not shown in FIG. 5) of the tip holder 50 holding the upper wear tip 36 in place holds an upper wear plate in place in a similar manner. A retractable pin 74 extending through the wall 20 further assists in holding the wear plate 14 in its proper position. Since the three tip holders 50 shown in FIG. 5 are identical they can replace each other. After some time of operation, usually causing most wear at the centre wear tip 34, the tip holders 50 may be taken out and then put back again at new positions to enable more hours of operation before the tips 32, 34, 36 are worn out.

Figure 6:
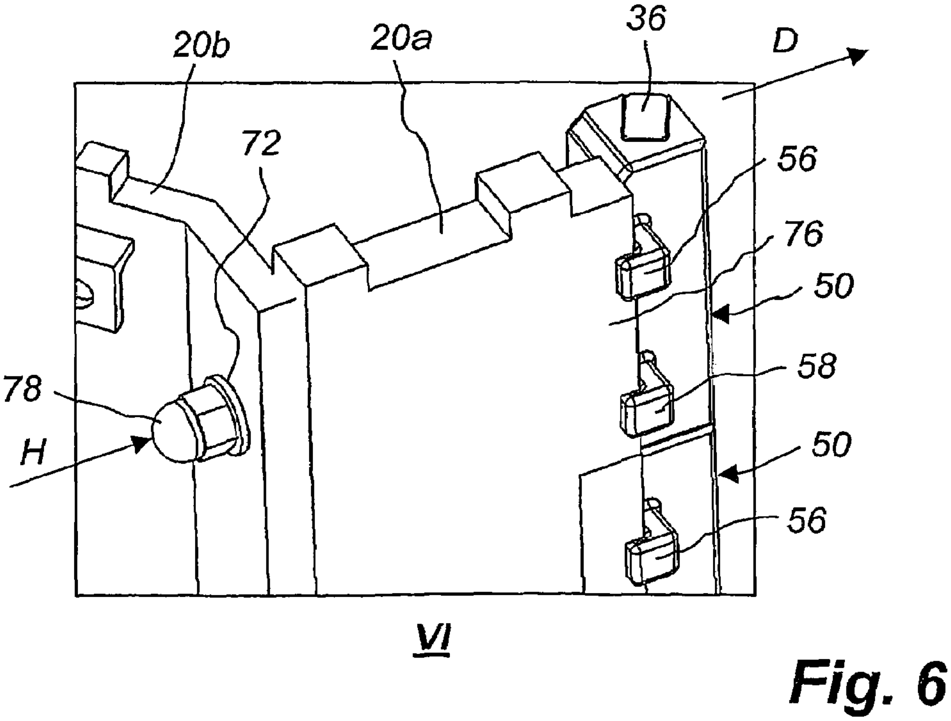
FIG. 6 shows a part of a wall segment as seen from the outside of the rotor, i.e. in the direction of arrow VI in FIG. 3.

FIG. 6 shows a part of the rotor as seen from the outside, i.e. in the direction of the arrow VI in FIG. 3. As can be seen the hooks 56, 58 of each tip holder 50 grips around the free vertical edge 76 of the first wall portion 20*a*. The threaded bar 62 of each tip holder 50 extends out of a hole 68, 70, 72 (of which only the hole 72 is indicated in FIG. 6) and is fixed towards the second wall portion 20*b* by a nut 78.

When mounting a tip holder 50 of the type described above the tip holder 50 is first allowed to slide along the first wall portion 20*a*. Thus the plate 60 and the threaded bar 62 are guided in a direction parallel to the first wall portion 20*a* until the hooks 56, 58 engage the free edge 76 and in such a way that the bar 62 passes through the hole 72. The nut 78 is screwed onto the part of the bar 62 extending on the outside of the second wall portion 20*b*. The nut 78 is a domed nut and thus protects the end portion of the threaded bar 62 from wear and from being hit by rocks. The risk that the end portion of the threaded bar 62 would be damaged such that dismounting the nut 78 becomes difficult is thus minimized. The nut 78 is tightened such that a certain, desired tension is obtained in the parts of the tip holder 50 that are located between the nut 78 and the hooks 56, 58. The nut 78 being located on the second wall portion 20*b* is protected by the first wall portion 20*a* from abrasive particles that often swirl around the rotor 1. Thus there is a limited risk that the nut 78 is worn down during operation of the crusher.

When a worn tip holder 50 is to be replaced a bed of material 40 has built up against the inside of the wall segment 20. The worn tip holder 50 may be released according to the following method. Firstly the nut 78 is unscrewed a few turns such that it is not tightly fixed to the bar 62. A hammer or similar tool is used to imply a force or a strike on the nut 78 and thus to the end part of the threaded bar 62 in the direction shown with an arrow H in FIG. 6. The nut 78 thus serve as a surface for implying the force or strike. The force or strike makes the tip holder 50, and in particular the threaded bar 62 and the plate 60, release from the often well compacted material bed 40. The nut 78 is then removed from the bar 62 such that the tip holder 50 may be taken away by guiding it away from the second wall portion 20*b* in a direction, which is indicted by an arrow D in FIG. 6, being substantially parallel to the first wall portion 20*a*. Thus a time consuming process of removing the bed 40 before dismounting the tip holder 50 may be avoided.

Figure 7:
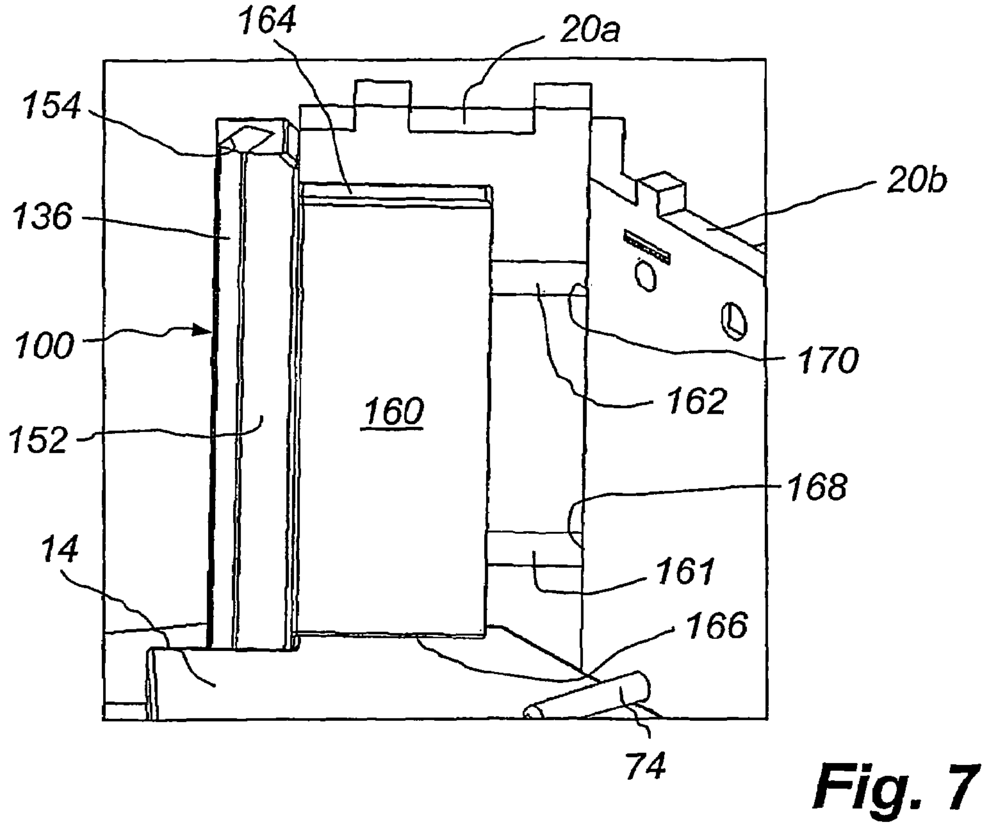
FIG. 7 shows a tip holder according to another embodiment of a tip holder according to the invention.

In FIG. 7 another embodiment of the invention in the form of a tip holder 100 is shown as seen from the inside of a rotor 1. The main differences compared to the tip holder 50 shown in FIG. 4 is that the tip holder 100 has a wide holding plate 160 and two threaded bars 161 and 162. The threaded bars 161, 162 extend through holes 168, 170 respectively, in the second wall portion 20*b*. The tip holder 100 has an upper shoulder 164 and a lower shoulder 166 for abutting against an upper wear plate (not shown) and a lower wear plate 14 respectively. A wear tip 136 located in a recess 154 of a holding part 152 extends over the whole vertical distance of the outflow opening. The tip holder 100 is mainly used for rotors 1 of smaller vertical extension and for rotors 1 were the mutual exchangeability of the tip holders 50 described above is not desired.

Figure 8:
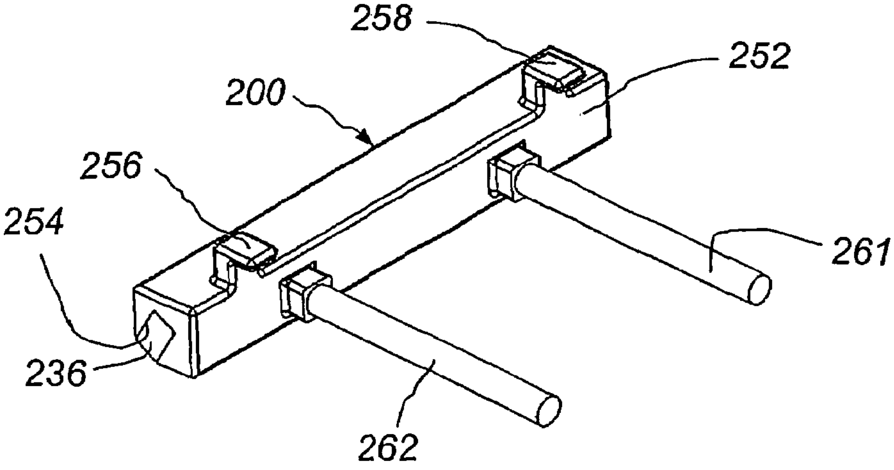
FIG. 8 is a three-dimensional view of still another embodiment of a tip holder according to the invention.

In FIG. 8 yet another embodiment of the invention in the form of a tip holder 200 is shown. The main differences between the tip holder 200 and the tip holder 50 shown in FIG. 4 is that the tip holder 200 has no holding plate and that threaded bars 261, 262 are attached directly to a holding part 252. The open space formed between the bars 261, 262 forms a material pocket. When such a tip holder 200 is attached to a rotor 1 the amount of material and the size of material that may be trapped in the bed 40 just behind the holding part 252 is increased. A wear tip 236 is fixed in a recess 254 of the holding part 252. The holding part 252 has two hooks 256, 258 for securing it to the vertical free edge 76 of the first wall portion 20*a*. The bars 261, 262 may have the additional function of acting as shoulders for holding horizontal wear plates in the correct position.

It will be appreciated that numerous modifications of the embodiments described above are possible within the scope of the appended claims.

The tip holder may be applied both to wall segments consisting of one physical sheet of metal that has been bent to form a first and a second wall portion and to wall segments were the first and second wall portions are made of separate pieces.

In an alternative embodiment the hooks 56, 58 are broadened such that the two hooks together form an elongated, continuous flange extending along the entire length of the holding part 52. Such a flange would thus grip the entire free edge 76 of the first wall portion 20*a* and thus provide a very firm fastening of the tip holder.

The two hooks 56, 58, or the above mentioned flange, may also extend further along the first wall portion 20*a* in the direction of the second wall portion 20*b*.

The invention claimed is:

1. A tip holder for mounting at an outflow opening of a rotor of a vertical shaft impact crusher, said rotor comprising a vertical rotor wall segment having a first wall portion being substantially tangential in relation to the rotor and a second wall portion being angled in relation to said first wall portion, said tip holder comprising: a holding part for holding a wear tip, a fastening means attached to the holding part, the fastening means extending along said first wall portion and through said second wall portion from one side thereof, said fastening means including a threaded bar extending parallel to said first wall portion, and a fixing means detachably fixable to the fastening means at the other side of said second wall portion and on an outer face of the second wall portion.

2. A tip holder according to claim 1, wherein the fastening means extends along the radial inner side of said first wall portion.

3. A tip holder according to claim 2, wherein the fastening means comprises at least one shoulder adapted to hold a horizontal wear plate in position.

4. A tip holder according to claim 3, wherein the fastening means comprises a lower shoulder and an upper shoulder, each being adapted to hold a horizontal wear plate in position.

5. A tip holder according to claim 1, wherein the tip holder comprises a securing means for removal and securing the tip holder to a free vertical edge of said first wall portion.

6. A tip holder according to claim 3, wherein said securing means comprises a hook adapted for gripping said edge of said first wall portion.

7. A tip holder according to claim 1, wherein said a threaded bar extends through a hole in said second wall portion.

8. A tip holder according to claim 7, wherein the fixing means comprises a nut which is adapted to provide a tensile stress in the threaded bar when fixing said fixing means to the threaded bar at said other side of the second wall portion.

9. A tip holder according to claim 1, wherein the fastening means comprises a surface adapted for the application of a force in a direction parallel to said first wall portion.

10. A method of mounting a tip holder to an outflow opening of a rotor of a vertical shaft impact crusher, said rotor comprising a vertical rotor wall segment having a first wall portion being substantially tangential in relation to the rotor and a second wall portion being angled in relation to said first wall portion, and said tip holder comprising a holding part for holding a wear tip, said method comprising:

guiding the tip holder along said first wall portion such that a threaded bar of a fastening means attached to the holding part extends parallel along said first wall portion and passes through said second wall portion from one side thereof, and fixing a fixing means to the fastening means at the other side of said second wall portion and on an outer face thereof.

* * * * *